US009584401B2

(12) United States Patent
Huang et al.

(10) Patent No.: US 9,584,401 B2
(45) Date of Patent: Feb. 28, 2017

(54) SWITCHLESS NETWORK TOPOLOGY SYSTEM FOR PARALLEL COMPUTATION AND METHOD THEREOF

(71) Applicant: National Cheng Kung University, Tainan (TW)

(72) Inventors: Chi-Chuan Huang, Tainan (TW); Chi-Hsiu Liang, Taichung (TW); Yu-Tin Chen, Hsinchu (TW)

(73) Assignee: National Cheng Kung University, Tainan (TW)

( * ) Notice: Subject to any disclaimer, the term of this patent is extended or adjusted under 35 U.S.C. 154(b) by 98 days.

(21) Appl. No.: 14/727,999

(22) Filed: Jun. 2, 2015

(65) Prior Publication Data

US 2015/0350057 A1 Dec. 3, 2015

(30) Foreign Application Priority Data

Jun. 3, 2014 (TW) .............................. 103119191 A

(51) Int. Cl.
*H04L 12/733* (2013.01)
*H04L 12/947* (2013.01)
*H04L 12/721* (2013.01)

(52) U.S. Cl.
CPC ............ *H04L 45/122* (2013.01); *H04L 49/25* (2013.01); *H04L 45/124* (2013.01)

(58) Field of Classification Search
CPC .......... H04J 14/0267; H04J 2203/0023; H04J 2203/0053; H04L 12/5689; H04L 45/00; H04L 45/10; H04L 45/22; H04L 49/25; H04L 49/256; H04L 45/122; H04L 45/124; H04M 2215/42; H04W 40/00; H04W 40/02

USPC .......................................................... 370/351
See application file for complete search history.

(56) References Cited

U.S. PATENT DOCUMENTS

| 7,302,482 | B2 * | 11/2007 | Rodosek | H04L 41/0213 370/232 |
| 8,503,448 | B2 * | 8/2013 | Spencer | H04L 45/02 370/390 |
| 2002/0004843 | A1 * | 1/2002 | Andersson | H04L 45/00 709/238 |
| 2006/0117110 | A1 * | 6/2006 | Vasseur | H04L 45/00 709/232 |

(Continued)

*Primary Examiner* — Chi H Pham
*Assistant Examiner* — Robert Lopata
(74) *Attorney, Agent, or Firm* — Woodard, Emhardt, Moriarty, McNett & Henry, LLP; Timothy Thomas

(57) ABSTRACT

A switchless network topology system for parallel computation is provided. The switchless network topology system includes a plurality of nodes, of which one node communicates with another node according to a routing table, where the creation of the routing table includes the following steps: calculating a shortest path of transmission paths between two nodes of the nodes, where the shortest path has no relay node or at least one relay node between the two nodes; removing the transmission path between a starting node and a first relay node of the shortest path and identifying another shortest path between the starting node and the destination node; repeating the step of removing and identifying to identify other shortest paths between the starting node and the destination node; and creating the routing table based on every shortest path between any starting node and any destination node of the nodes.

6 Claims, 3 Drawing Sheets

(56) References Cited

U.S. PATENT DOCUMENTS

| | | | |
|---|---|---|---|
| 2008/0151893 A1* | 6/2008 | Nordmark | H04L 45/00 370/392 |
| 2009/0285124 A1* | 11/2009 | Aguirre | H04L 45/122 370/255 |
| 2012/0011278 A1* | 1/2012 | Smith, Jr. | H04L 45/028 709/242 |
| 2012/0314618 A1* | 12/2012 | Ben-Houidi | H04L 12/4641 370/254 |
| 2013/0021943 A1* | 1/2013 | Lu | H04L 45/023 370/254 |

* cited by examiner

SWITCHLESS NETWORK TOPOLOGY SYSTEM FOR PARALLEL COMPUTATION AND METHOD THEREOF

BACKGROUND

Technical Field

The present invention relates to the technical field of computer networks, and in particular, to a switchless network topology system for parallel computation and method.

Related Art

The demand for a high-performance computer or computer system originates from the need to provide optimized use of hardware and software, and the high-performance computer or computer system is implemented by using a processing node including one or more microprocessors and memories. These computer systems are sometimes referred to as shared multi-processor systems. In one shared multi-processor computer system, processors are considered as network nodes for mutual connection, so that these processors can communicate with each other, to share operating systems, resources, data, memories, and the like.

In a parallel computation computer system, as the number of computer nodes increases, network communication between nodes grows greatly. To accelerate communication between two nodes, a switch is used for communication between the nodes. However, as the number of nodes grows larger, the number of used switches grows larger, and the number of layers of switches that use, for example, a fat tree structure also increases, which therefore results in that an entire network system has a very complex structure and the cost of the network system also increases.

SUMMARY

In view of the foregoing problem, an objective of the present invention is to provide a switchless network topology system for parallel computation and method, in which shortest paths between every two nodes in a topological network system are obtained through calculation by using an algorithm, so that communication between every two nodes becomes faster without using switches or without partially using switches to perform communication between every two nodes, and therefore the structure of the entire network system becomes simple and the cost of the network system does not increase either.

A first aspect of the present invention is to provide a switchless network topology system for parallel computation, which includes:

a plurality of nodes, each node being one of a computing block on chip, a memory controller, a single core on chip, a processor, a storage hard drive, a computer, a group of internally optimized group of computers, and a computational center, a routing table being built in each node, and communication being performed between any starting node and any destination node of the nodes according to the routing table;

where the creation of the routing table includes the following steps:

calculating a shortest path of transmission paths between a starting node and a destination node of the nodes, where the shortest path has no relay node or has at least one relay node between the starting node and the destination node;

removing the transmission path between the starting node and a first relay node of the shortest path, identifying another shortest path of the transmission paths between the starting node and the destination node, repeating the step of removing and identifying for the another shortest path to identify other shortest paths between the starting node and the destination node; and creating the routing table based on every shortest path between any starting node and any destination node of the nodes.

A second aspect of the present invention is to provide a switchless network topology method for parallel computation, which is applied to a switchless network topology system, where the switchless network topology system includes a plurality of nodes, each node is one of a computing block on chip, a memory controller, a single core on chip, a processor, a storage hard drive, a computer, a group of internally optimized group of computers, and a computational center, and the method includes the following steps:

storing a routing table in each node of the nodes; and performing, by the switchless network topology system, communication between any starting node and any destination node of the nodes according to the routing table;

where the creation of the routing table includes the following steps:

calculating a shortest path of transmission paths between a starting node and a destination node of the nodes, where the shortest path has no relay node or has at least one relay node between the starting node and the destination node;

removing the transmission path between the starting node and a first relay node of the shortest path, identifying another shortest path between the starting node and the destination node, and repeating the step of removing and identifying for the another shortest path to identify other shortest paths between the starting node and the destination node; and creating the routing table based on every shortest path between any starting node and any destination node of the nodes.

The switchless network topology system and method of the present invention will be described below in detail with reference to the following embodiments, and also as set forth in applicants' Taiwanese priority application No. 103119191, filed Jun. 3, 2014, the entire contents of which are hereby incorporated herein by reference. However, these embodiments are used mainly to assist in understanding the present invention, but not to restrict the scope of the present invention. Various possible modifications and alterations could be conceived of by one skilled in the art to the form and the content of any particular embodiment, without departing from the spirit and scope of the present invention, which is intended to be defined by the appended claims.

DETAILED DESCRIPTION

To enable persons of ordinary skill in the technical field of the present invention to further understand the present invention, the content and efficacy to achieve of the present invention are described in detail below with reference to the preferred embodiments of the present invention and the accompanying drawings.

Figure 1:
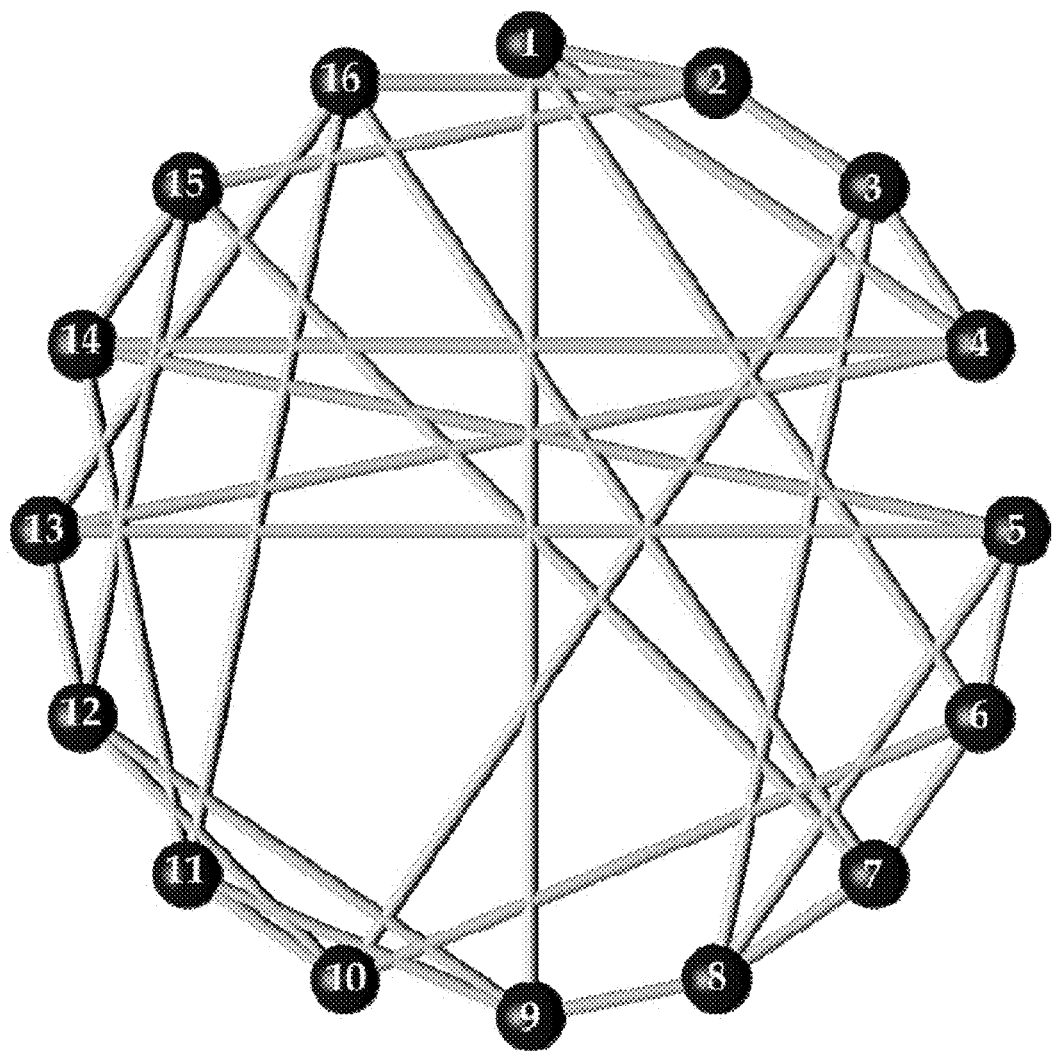
FIG. 1 is a schematic diagram of a node architecture of a switchless network topology system for parallel computation according to the present invention.

FIG. 1 is a schematic diagram of a node architecture of a switchless network topology system for parallel computation according to the present invention. In FIG. 1, the switchless network topology system includes a plurality of nodes (the sequence numbers of the nodes are 1, 2, ..., 16), each node is one of a computing block on chip, a memory controller, a single core on chip, a processor, a storage hard drive, a computer, a group of internally optimized group of computers, and a computational center, and a routing table is built in each node. The switchless network topology system performs communication between any starting node and any destination node of the nodes according to data of transmission paths in the routing table.

In this embodiment of the present invention, 16 nodes are used as an example to describe a communication operation of the switchless network topology system. However, the number of the nodes is not limited in the present invention, and the number of nodes in the switchless network topology system in the present invention may be up to thousands or even tens of thousands.

A shortest path between a starting node and a destination node of a communication path in a routing table is calculated by using an algorithm such as a method of exhaustion, a Dijkstra's algorithm or a Floyd-Warshall algorithm to create path data of the routing table.

First, the algorithm is used to calculate a shortest path between any two nodes A and B (a starting node and a destination node) in the network topology system. After the shortest path between the nodes A and B is found, a connecting path between the node A and a node (that is, a first relay node) connected to the node A is cut off, and a topology without such a connecting path is then used to find another shortest path between the nodes A and B. The foregoing step is repeated. A connecting path between the node A of another shortest path and another first relay node connected to the node A is cut off, and a topology without such a connecting path is then used to find all other shortest paths between the nodes A and B.

Moreover, if all connecting paths between the node A and the first relay node of the shortest paths between the nodes A and B have been considered, it starts to be considered to delete a second-layer path (a connecting path between the first relay node and a second relay node connected to the first relay node), a third-layer path (a connecting path between the second relay node and a third relay node connected to the second relay node), ..., of the shortest path between the nodes A and B, and the foregoing manner of finding a shortest path is used to identify shortest paths that separately correspond to the second-layer path, the third-layer path, ..., between the nodes A and B. By using such a cycle, n shortest paths between the nodes A and B can be found, where n may be a positive integer set by a user.

When the topology is large and the number of nodes is large, the calculation of shortest paths is an issue that requires a heavy calculation load. However, when the network nodes have a very even number of connections and an optimized structure, it may be considered not to use a starting point and a destination point of nodes as conditions to set a route of a communication path, and instead, it may be considered in a simplified manner to use a connecting path between a current node and a next node as a route of a communication path.

In the node architecture in FIG. 1, a Dijkstra's algorithm is used to obtain through calculation the following group of shortest paths between every two nodes:
14-15,14-15-2,14-4,14-4-1,14-15-7,14-11-16,14-11-9, 14-5-8,14-5,14-15-12,14-11,14- 11-10,14-5-6,14-4-13,14-4-3,15-14,15-2,15-14-4,15-2-1,15-7,15-2-16,15-12-9,15-7-8,15-1 4-5,15-12,15-14-11,15-12-10,15-7-6,15-12-13,15-2-3,2-15-14,2-15,2-1-4,2-1,2-15-7,2-16,2 -1-9,2-3-8,2-15-14-5,2-15-12,2-16-11,2-3-10,2-1-6,2-16-13,2-3,4-14,4-14-15, 4-1-2,4- 1,4-1 4-15-7,4-13-16,4-1-9,4-3-8,4-14-5,4-13-12, 4-14-11,4-3-10,4-1-6,4-13,4-3,1-4-14,1-2-15,1- 2,1-4,1-6-7, 1-2-16,1-9,1-9-8,1-6-5,1-9-12,1-9-11,1-6-10,1-6,1-4-13,1-2-3,7-15-14,7-15,7-1 5-2,7-15-14-4,7-6-1,7-16,7-8-9,7-8,7-8-5,7-15-12,7-16-11,7-6-10,7-6,7-16-13,7-8-3,16-11-14,16-2-15,16-2,16-13-4,16-2-1,16-7,16-11-9,16-7-8,16-13-5,16-13-12,16-11,16-11-10,16- 7-6,16-13,16-2-3,9-11-14,9-12-15,9-1-2,9-1-4,9-1,9-8-7,9-11-16,9-8,9-8-5,9-12,9-11,9-12- 10,9-1-6,9-12-13,9-8-3,8-5-14,8-7-15,8-3-2,8-3-4, 8-9-1,8-7,8-7-16,8-9,8-5,8-9-12,8-9-11,8 -3-10,8-7-6,8-5-13,8-3,5-14,5-14-15,5-14-15-2,5-14-4,5-6-1,5-8-7,5-13-16, 5-8-9,5-8,5-13- 12,5-14-11,5-6-10,5-6,5-13,5-8-3,12-15-14, 12-15,12-15-2,12-13-4,12-9-1,12-15-7,12-13-1 6,12-9,12-13-5,12-9-11,12-10,12-10-6,12-13,12-10-3,11-14, 11-14-15,11-16-2,11-14 -4,11-9-1,11-16-7,11-16,11-9,11-9-8,11-14-5,11-9-12,11-10,11-10-6,11-16-13,11-10-3,10- 11-14,10-12-15,10-3-2,10-3-4,10-6-1,10-6-7,10-11-16,10- 12-9,10-3-8,10-6-5,10-12,10-11, 10-6,10-12-13,10-3,6-5-14,6-7-15,6-1-2,6-1-4,6-1,6-7,6-7-16,6-1-9,6-7-8,6-5,6-10-12,6-10- 11,6-10,6-5-13,6-10-3,13-4-14,13-12-15,13-16-2, 13-4,13-4-1,13-16-7,13-16,13-12-9,13-5- 8,13-5,13-12,13-16-11,13-12-10,13-5-6,13-4-3,3-4-14,3-2-15,3-2,3-4,3-2-1, 3-8-7,3-2-16,3- 8-9,3-8,3-8-5,3-10-12,3-10-11,3-10,3-10-6, 3-4-13
the average length of the path is: 1.75

Each row of the shortest paths represents a path obtained through calculation by using a Dijkstra's algorithm. In a number row between commas, a first number is a sequence number of a starting node, a last number is a sequence number of a destination node, and more than zero middle number represents a sequence number of a relay node.

For the network topology structure in FIG. 1, a distance matrix between every two nodes may be rapidly obtained through calculation. As shown in Table 1, the numbers in the first column and the first row in Table 1 represent sequence numbers of nodes, and the numbers in the rest columns and rows represent path distances between two nodes.

TABLE 1

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 1 | 2 | 1 | 2 | 1 | 2 | 2 | 1 | 2  | 2  | 2  | 2  | 2  | 2  | 2  |
| 2 | 1 | 0 | 1 | 2 | 3 | 2 | 2 | 2 | 2 | 2  | 2  | 2  | 2  | 2  | 1  | 1  |
| 3 | 2 | 1 | 0 | 1 | 2 | 2 | 2 | 1 | 2 | 1  | 2  | 2  | 2  | 2  | 2  | 2  |
| 4 | 1 | 2 | 1 | 0 | 2 | 2 | 3 | 2 | 2 | 2  | 2  | 2  | 1  | 1  | 2  | 2  |
| 5 | 2 | 3 | 2 | 2 | 0 | 1 | 2 | 1 | 2 | 2  | 2  | 2  | 1  | 1  | 2  | 2  |
| 6 | 1 | 2 | 2 | 2 | 1 | 0 | 1 | 2 | 2 | 1  | 2  | 2  | 2  | 2  | 2  | 2  |
| 7 | 2 | 2 | 2 | 3 | 2 | 1 | 0 | 1 | 2 | 2  | 2  | 2  | 2  | 2  | 1  | 1  |
| 8 | 2 | 2 | 1 | 2 | 1 | 2 | 1 | 0 | 1 | 2  | 2  | 2  | 2  | 2  | 2  | 2  |
| 9 | 1 | 2 | 2 | 2 | 2 | 2 | 2 | 1 | 0 | 2  | 1  | 1  | 2  | 2  | 2  | 2  |

TABLE 1-continued

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 10 | 2 | 2 | 1 | 2 | 2 | 1 | 2 | 2 | 2 | 0  | 1  | 1  | 2  | 2  | 2  | 2  |
| 11 | 2 | 2 | 2 | 2 | 2 | 2 | 2 | 2 | 1 | 1  | 0  | 2  | 2  | 1  | 2  | 1  |
| 12 | 2 | 2 | 2 | 2 | 2 | 2 | 2 | 2 | 1 | 1  | 2  | 0  | 1  | 2  | 1  | 2  |
| 13 | 2 | 2 | 2 | 1 | 1 | 2 | 2 | 2 | 2 | 2  | 2  | 1  | 0  | 2  | 2  | 1  |
| 14 | 2 | 2 | 2 | 1 | 1 | 2 | 2 | 2 | 2 | 2  | 1  | 2  | 2  | 0  | 1  | 2  |
| 15 | 2 | 1 | 2 | 2 | 2 | 2 | 1 | 2 | 2 | 2  | 2  | 1  | 2  | 1  | 0  | 2  |
| 16 | 2 | 1 | 2 | 2 | 2 | 2 | 1 | 2 | 2 | 2  | 1  | 2  | 1  | 2  | 2  | 0  |

By using FIG. 1 as an example, a shortest path between a starting node 4 and a destination node 7 has a distance of 3, and sequence numbers of nodes of a connecting path of the shortest path is 4-14-15-7. After the connecting path between the starting node 4 and the first relay node 14 is removed, it is identified that a connecting path in which sequence numbers of nodes are 4-3-8-7 is also a shortest path and has a distance of 3. Next, after the connecting path between the starting node 4 and the first relay node 3 is removed, it is identified that a connecting path in which sequence numbers of nodes are 4-13-16-7 is also a shortest path and also has a distance of 3. Next, after the connecting path between the starting node 4 and the first relay node 13 is removed, it is further identified that a connecting path in which sequence numbers of nodes are 4-1-6-7 is also a shortest path.

As can be seen from the above description, the first relay nodes 14, 3, 13, 1 are all nodes directly connected to the starting node 4, and may also be referred to as first-layer nodes. FIG. 1 clearly shows that in this topology, the four network nodes directly connected to the starting node 4 can all provide a shortest path to the destination node 7.

In this example, it shows that there is more than one connecting path from the starting node 4 to the destination node 7, and the four first relay nodes 14, 3, 13, 1 connected to the starting node 4 can all be used as first transfer points. Therefore, the starting node 4 takes all the first relay nodes 14, 3, 13, 1 as next hops of the shortest paths to the destination node 7, and stores the first relay nodes 14, 3, 13, 1 in a routing table of the starting node.

However, for the next first-layer node, there is only one first-layer shortest path separately from the first relay nodes 14, 3, 13, 1 to the destination node 7, that is, the connecting paths in which sequence numbers of nodes are separately 3-8-7, 14-15-7, 13-16-7, and 1-6-7 are the first-layer shortest paths, and therefore it is unnecessary to continue to delete a second-layer path to identify shortest paths of other layers.

However, in a more complex network, a plurality of shortest paths may also be found after the first-layer node, or even may also be found in the second layer, the third layer, and many farther layers, and sequence numbers of nodes of next hops of shortest paths are saved in routing tables of corresponding nodes.

It is assumed that the shortest path between the nodes A and B has a distance of 4, and a plurality of, that is, n shortest paths having a distance of 4 may be found in the network. This program can continue identifying in an infinite loop, or n may be set as an upper number limit for the limit of system hardware resources (for example, capacity limit of a memory of a router), thereby avoiding influence on efficiency of a network during communication.

Figure 2:
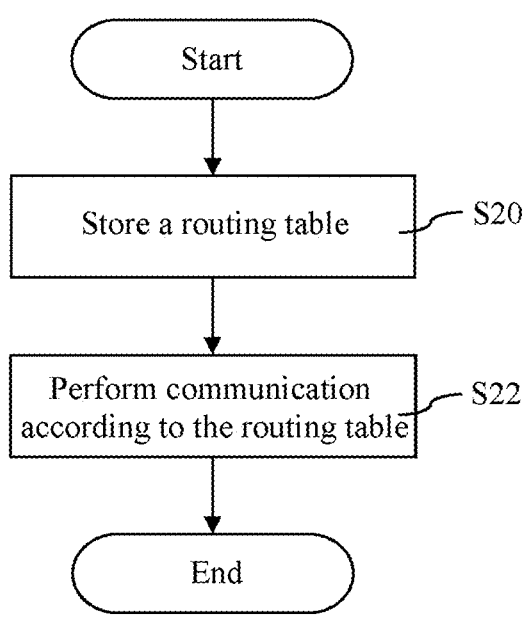
FIG. 2 is a flowchart of a switchless network topology method for parallel computation according to the present invention.

FIG. 2 is a flowchart of a switchless network topology method for parallel computation according to the present invention. In the description of the procedure steps in FIG. 2, reference may be made to components in FIG. 1 and Tables 1 and 2.

In FIG. 2, shortest paths between every two nodes are first obtained through calculation according to the number of nodes in FIG. 1 by using an algorithm such as a method of exhaustion, a Dijkstra's algorithm or a Floyd-Warshall algorithm. Sequence numbers of nodes of at least one shortest path and sequence numbers of nodes of a next hop are created into a routing table, and the routing table is stored in a corresponding node (Step S20).

Figure 3:
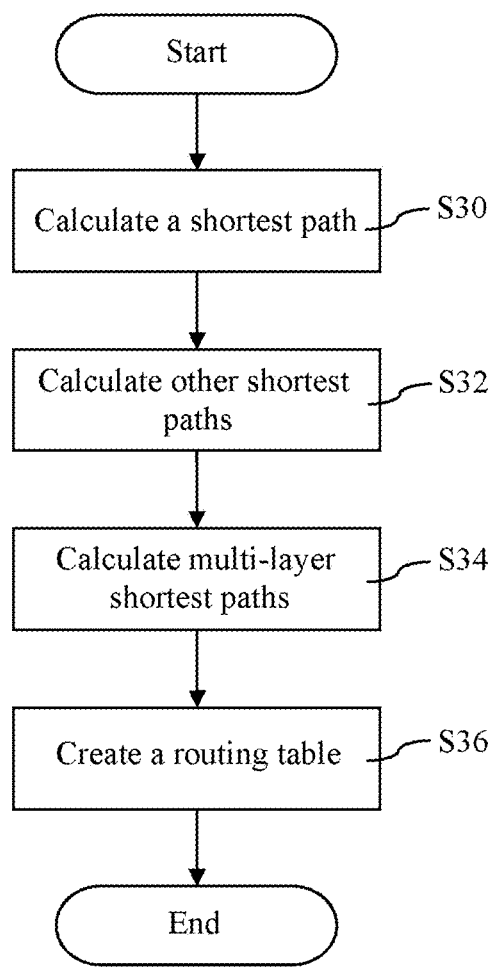
FIG. 3 is a flowchart of a method for creating a routing table according to the present invention.

The data for creating a routing table is shown in FIG. 3, which is a flowchart of a method for creating a routing table according to the present invention. In FIG. 3, for a node architecture in FIG. 1, shortest paths between every two nodes are obtained through calculation by using a Dijkstra's algorithm (Step S30).

By using one shortest path in FIG. 1 as an example, the shortest path is a connecting path that is obtained through calculation by using a Dijkstra's algorithm and has sequence numbers of nodes being 4-14-15-7.

Next, after the connecting path between the starting node 4 and the first relay node 14 is removed, it is identified that a connecting path in which sequence numbers of nodes are 4-3-8-7 is also a shortest path and has a distance of 3. Next, after the connecting path between the starting node 4 and the first relay node 3 is removed, it is identified that a connecting path in which sequence number of nodes are 4-13-16-7 is also a shortest path, and has a distance of 3. Next, after the connecting path between the starting node 4 and the first relay node 13 is removed, it is further identified that a connecting path in which sequence numbers of nodes is 4-1-6-7 is also a shortest path (Step S32).

Next, for the first relay nodes 14, 3, 13, 1 being first-layer nodes, a first-layer shortest path other than the connecting path in which sequence numbers of nodes are 14-15-7 from the first relay node 14 to the destination node 7 is identified, that is, after the connecting path between the first relay node 14 and the second relay node 15 is removed, a first-layer shortest path having a same path distance is identified, and for connecting paths in which sequence numbers of nodes are separately 3-8-7, 14-15-7, 13-16-7, and 1-6-7, a first-layer shortest path is also identified in a same manner (Step S34).

However, there is only one first-layer shortest path separately from the first relay nodes 14, 3, 13, 1 to the destination node 7 and no second first-layer shortest path can be identified, that is, connecting paths in which sequence numbers of nodes are separately 3-8-7, 14-15-7, 13-16-7, and 1-6-7 are first-layer shortest paths, and therefore it is unnecessary to continue to delete a second-layer path to identify other-layer shortest paths.

As described above, a routing table is created based on every shortest path between any starting node and any destination node of the network nodes in FIG. 1 (Step S36), and the created routing table is stored in each node of the network nodes in FIG. 1.

To reduce the size that a routing table occupies in a memory, for the data of a routing table of each node, sequence numbers of nodes of a shortest path and sequence numbers of nodes of a next hop may be recorded. In the above example, a part of data of a routing table of the node 4 may be the sequence number 4 of the node and the sequence numbers 14, 3, 13, 1 of the first relay nodes.

Referring to FIG. 2 again, after a routing table is stored in each node in a switchless network topology system, the switchless network topology system performs communication between any starting node and any destination node of the nodes in FIG. 1 according to the data of the transmission path of the routing table (Step S22).

The present invention provides a switchless network topology system for parallel computation and method, of which the advantage lies in that the topological network system obtains shortest paths between every two nodes through calculation by using an algorithm, identifies other shortest paths having a same path distance, and creates data of all shortest paths into a routing table and saves the routing table in each node. The switchless network topology system achieves faster communication between every two nodes according to the data of transmission paths of the routing table without using switches to perform communication between every two nodes. Therefore, the structure of the entire network system becomes simple, and the cost of the network system does not increase either.

Although the present invention has been described above with reference to preferred specific examples and exemplary accompanying drawings, the preferred specific examples and exemplary accompanying drawings should not be construed as limitations. Various changes, omissions, and variations made to forms and content of specific examples by a person skilled in the art still fall within the scope as defined in the claims of the present invention.

What is claimed is:

1. A switchless network topology system for parallel computation, comprising:
   a plurality of nodes, each node being one of a computing block on chip, a memory controller, a single core on chip, a processor, a storage hard drive, a computer, a group of internally optimized group of computers, and a computational center: wherein each node being configured to create a routing table by:
   calculating a shortest path of transmission paths between a starting node and a destination node of the nodes, wherein the shortest path has no relay node or has at least one relay node between the starting node and the destination node;
   removing the transmission path between the starting node and a first relay node of the shortest path, identifying another shortest path between the starting node and the destination node, and repeating the step of removing and identifying for the another shortest path to identify other shortest paths between the starting node and the destination node; and
   creating the routing table based on every shortest path between any starting node and any destination node of the nodes.

2. The switchless network topology system according to claim 1, wherein the creation of the routing table further comprises the following steps:
   removing a transmission path between two adjacent relay nodes in every shortest path, identifying a multi-layered shortest path between the adjacent former relay node and the destination node, and creating the multi-layered shortest path in the routing table.

3. The switchless network topology system according to claim 1, wherein the shortest path between the starting node and the destination node is calculated by using one of a method of exhaustion, a Dijkstra's algorithm, and a Floyd-Warshall algorithm.

4. A switchless network topology method for parallel computation, applied to a switchless network topology system, wherein the switchless network topology system comprises a plurality of nodes, each node being one of a computing block on chip, a memory controller, a single core on chip, a processor, a storage hard drive, a computer, a group of internally optimized group of computers, and a computational center, and the method comprises the following steps:
   storing a routing table in each node of the nodes; and
   performing, by the switchless network topology system, communication between any starting node and any destination node of the nodes according to the routing table;
   wherein the creation of the routing table comprises the following steps:
   calculating a shortest path of transmission paths between a starting node and a destination node of the nodes, wherein the shortest path has no relay node or has at least one relay node between the starting node and the destination node;
   removing the transmission path between the starting node and a first relay node of the shortest path, identifying another shortest path between the starting node and the destination node, and repeating the step of removing and identifying for the another shortest path to identify other shortest paths between the starting node and the destination node; and
   creating the routing table based on every shortest path between any starting node and any destination node of the nodes.

5. The switchless network topology method according to claim 4, wherein the step of creating the routing table further comprises the following steps:
   removing a transmission path between two adjacent relay nodes in every shortest path, identifying a multi-layered shortest path between the adjacent former relay node and the destination node, and creating the multi-layered shortest path in the routing table.

6. The switchless network topology method according to claim 4, wherein the shortest path between the starting node and the destination node is calculated by using one of a method of exhaustion, a Dijkstra's algorithm, and a Floyd-Warshall algorithm.

* * * * *